US012626312B2

(12) United States Patent
Man et al.

(10) Patent No.: US 12,626,312 B2
(45) Date of Patent: May 12, 2026

(54) CONSTRUCTION PROJECT RISK ASSESSMENT AND MITIGATION

(71) Applicant: Procore Technologies, Inc., Carpinteria, CA (US)

(72) Inventors: Matt Man, Thornhill (CA); David Starr, New York, NY (US); Joshua Nguyen, Austin, TX (US); Hesham Younes, New Orleans, LA (US); Andrew Dunn, New Orleans, LA (US)

(73) Assignee: Procore Technologies, Inc., Carpinteria, CA (US)

( * ) Notice: Subject to any disclaimer, the term of this patent is extended or adjusted under 35 U.S.C. 154(b) by 544 days.

(21) Appl. No.: 17/833,520

(22) Filed: Jun. 6, 2022

(65) Prior Publication Data

US 2023/0394605 A1    Dec. 7, 2023

(51) Int. Cl.
*G06Q 50/08* (2012.01)
*G06N 5/02* (2023.01)
*G06Q 10/0635* (2023.01)

(52) U.S. Cl.
CPC .............. *G06Q 50/08* (2013.01); *G06N 5/02* (2013.01); *G06Q 10/0635* (2013.01)

(58) Field of Classification Search
CPC . G06Q 10/0635; G06F 40/30; G06F 16/9024; G06F 16/2379; G06F 21/577; G06N 20/20; G06N 20/00
See application file for complete search history.

(56) References Cited

U.S. PATENT DOCUMENTS

2003/0225683 A1 * 12/2003 Hill ........................ G06Q 10/06
                                                          705/37
2013/0282557 A1 * 10/2013 Allin ...................... G06Q 50/08
                                                          705/38
(Continued)

FOREIGN PATENT DOCUMENTS

AU        2010200800 A1 *   3/2010   ............. G06Q 10/06
AU        2016203288 A1 *   6/2016   ............. G06Q 10/06
(Continued)

OTHER PUBLICATIONS

S. A. Shinn, et al. "The Business Change Initiative: A novel approach to improved cost and schedule management," 2016 IEEE Aerospace Conference, Big Sky, MT, USA, 2016, pp. 1-20, doi: 10.1109/AERO.2016.7500733 <https://ieeexplore.ieee.org/document/7500733?source=IQplus> (Year: 2016).*
(Continued)

*Primary Examiner* — Jerry O'Connor
*Assistant Examiner* — Michael R Koester
(74) *Attorney, Agent, or Firm* — Lee Sullivan Shea & Smith LLP

(57) ABSTRACT

A computing platform is configured to (i) receive data objects related to a construction project, (ii) add the data objects to a construction knowledge graph as nodes that are connected to other nodes representing other data objects, (iii) determine, via a machine-learning model trained using historic construction project data, a first risk score for a first data object, (iv) determine, via the machine-learning model, a second risk score for a second data object, where the second risk score is based on (a) the first risk score and (b) a degree of separation between the first data object and the second data object in the construction knowledge graph, (v) based on the second risk score, automatically generate a suggested action to be taken with respect to the first data object, and (vi) cause an indication of the suggested action
(Continued)

to be displayed at a client station of a user associated with the construction project.

20 Claims, 7 Drawing Sheets

(56)                     References Cited

U.S. PATENT DOCUMENTS

| | | | |
|---|---|---|---|
| 2018/0349817 A1* | 12/2018 | Goel ........................ | G06F 30/13 |
| 2020/0074383 A1* | 3/2020 | Smith ........................ | F16P 3/14 |
| 2022/0129805 A1* | 4/2022 | Ruckaberle ...... | G06Q 10/06393 |

FOREIGN PATENT DOCUMENTS

| | | | |
|---|---|---|---|
| WO | WO-2022140460 A1 * | 6/2022 | ........... G05B 19/406 |
| WO | WO-2022234273 A1 * | 11/2022 | ............... G06N 7/01 |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

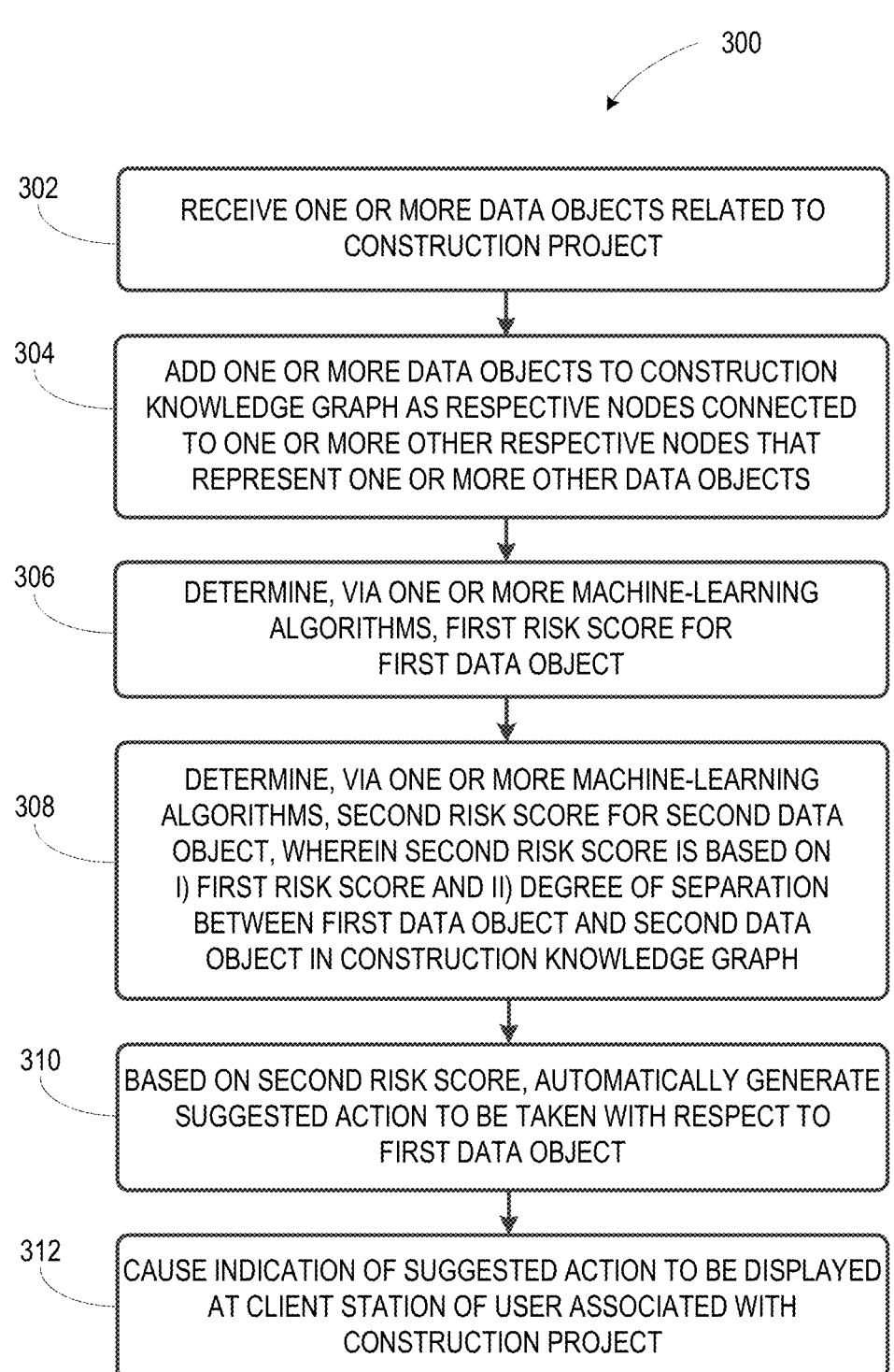

300

302 RECEIVE ONE OR MORE DATA OBJECTS RELATED TO CONSTRUCTION PROJECT

304 ADD ONE OR MORE DATA OBJECTS TO CONSTRUCTION KNOWLEDGE GRAPH AS RESPECTIVE NODES CONNECTED TO ONE OR MORE OTHER RESPECTIVE NODES THAT REPRESENT ONE OR MORE OTHER DATA OBJECTS

306 DETERMINE, VIA ONE OR MORE MACHINE-LEARNING ALGORITHMS, FIRST RISK SCORE FOR FIRST DATA OBJECT

308 DETERMINE, VIA ONE OR MORE MACHINE-LEARNING ALGORITHMS, SECOND RISK SCORE FOR SECOND DATA OBJECT, WHEREIN SECOND RISK SCORE IS BASED ON I) FIRST RISK SCORE AND II) DEGREE OF SEPARATION BETWEEN FIRST DATA OBJECT AND SECOND DATA OBJECT IN CONSTRUCTION KNOWLEDGE GRAPH

310 BASED ON SECOND RISK SCORE, AUTOMATICALLY GENERATE SUGGESTED ACTION TO BE TAKEN WITH RESPECT TO FIRST DATA OBJECT

312 CAUSE INDICATION OF SUGGESTED ACTION TO BE DISPLAYED AT CLIENT STATION OF USER ASSOCIATED WITH CONSTRUCTION PROJECT

FIG. 3

CONSTRUCTION PROJECT RISK ASSESSMENT AND MITIGATION

BACKGROUND

Software applications are used on a regular basis to perform and manage tasks in users' personal and professional capacities. As some examples, software applications may assist users with managing tasks related to email communications, customer relationship management, billing and payroll processing, human resources management, and construction project design and management. Many other types of software applications exist.

Software applications handle a large volume of information and can be complex. It is therefore desirable for software applications to provide sophisticated features and tools which can enhance a user's ability to interact with the software application, obtain desired information, and improve the overall user experience. Thus, any tool that can improve a user's interaction with a software application is desired.

Overview

A construction project often involves the creation of an immense amount of information, involving a large number of different stakeholders that may be creators or consumers—often both—of such information. At the inception of a construction project an owner may coordinate with planners, architects, and engineers in a planning and design phase to define the scope and develop the design for the project (e.g., a new building). This phase may take months or years depending on the size of the project, and may result in the creation of project-specific design specifications, architectural plans, engineering plans, etc. These various different plans generally comprise visual representations of the construction project that visually communicate information about the construction project, such as how to assemble or construct different parts of the project. Such visual representations tend to take one of at least two different forms. One form may be a two-dimensional technical drawing in which two-dimensional line segments of the drawing represent certain physical elements of the construction project like walls and ducts. In this respect, a two-dimensional technical drawing could be embodied either in paper form or in a computerized form, such as an image file (e.g., a PDF, JPEG, etc.), or via software for viewing a two-dimensional drawing model.

As another possibility, a construction project's design plans may be represented by a three-dimensional model that is embodied in a computerized form, such as in a building information model (BIM) file, with three-dimensional meshes visually representing the physical elements of the construction project (e.g., walls, ducts, etc.). Specialized software is configured to edit and access the BIM file and render a three-dimensional view of the construction project from one or more perspectives.

Following the planning and design phase, a preconstruction phase may introduce additional stakeholders such as project managers, general contractors, and subcontractors, each of whom may work with estimators to prepare cost estimates for the project in order to prepare corresponding bids (e.g., bids to perform work on a certain portion of the project). During this phase, stakeholders may also go through one or more pre-qualification processes to evaluate their financial stability, insurance information, prior work history, safety violations, etc. In turn, the owner may award contracts to construct the project, and these contracts may contain additional terms and expectations regarding the project's construction, including a project budget and contingencies.

Thereafter, the construction managers and/or contractors may generate still further information for the project, including additional bidding and selection of subcontractors within different trades (e.g., concrete, masonry, carpentry, plumbing, etc.), risk management plans, safety plans, and work breakdown structures, which include a listing of activities (e.g., pouring a foundation, installing a door, etc.) and the tasks required to complete each activity. In this regard, a typical construction project may include thousands of such activities that may need to be broken down in order to create a clear roadmap for the construction process.

Relatedly, a scheduler may develop a project schedule that orders all of the activities in the work breakdown structure(s) and establishes the timing of construction. For instance, a project schedule may establish a critical path of activities that dictates the longest time to project completion, may identify activities that can be performed in parallel, and may include milestones for certain activities to assist project managers with assessing whether a project is on schedule.

The construction phase may follow, sometimes referred to as the execution phase. During this phase, contractors and subcontractors order and take delivery of materials, update their individual budgets, establish labor management plans and monthly, weekly, or daily schedules, and generally construct the project. Once construction is underway, a project manager or general contractor may track the work that is performed in relation to the project schedule, as well as the quality of the work that is performed in relation to the design specifications. As work is partially performed, requests for partial payment may made, which may be approved upon confirmation of the work performed is commensurate with the payment. In this regard, funds tend to flow from lenders to owners to general contractors and finally to subcontractors. Disputes at any point in this process can delay payments for the parties involved, which sometimes involves the preservation and/or assertion of lien rights. Further, the project manager or general contractor may track the project budget as construction progresses.

In addition to the information discussed above that is continually being generated throughout the construction phase, changes will invariably occur in every construction project. For example, construction materials may suffer from shortages or delivery delays, the weather may prevent some work from being completed when planned, or an object may be installed incorrectly requiring it to be removed and reinstalled, leading to updates to the project schedule. As another possibility, the architectural or engineering drawings may need to be revised to account for unforeseen field conditions, to correct a design error, or to incorporate an owner-directed change. In these situations, a change order may be generated, submitted to one or more stakeholders for approval and analysis (e.g., to determine the impact to the project budget and/or schedule). Once approved, a drawing revision may be issued and the two-dimensional technical drawings and/or three-dimensional model may be updated accordingly, or a sketch may be provided in lieu of updating the drawings. Similarly, the project budget may be updated to reflect the approved change order, and a revised schedule may be developed. In other situations, a change order might affect some aspects of the construction project but not others—e.g., a change order may not affect the drawings or the budget but may impact the schedule.

In some cases, a given change to a project during construction may have a cascading effect, not only due to the direct impacts the change might have on the budget or schedule, but also due to the indirect impacts that may arise. For example, a change to the size or location of a piece of mechanical equipment within a building may require a change to a wall configuration, which in turn may require repositioning of electrical conduit that was designed to be placed within the walls, and so on. At the construction stage, each of these changes may affect a different subcontractor's scope of work, budget, and schedule, all of which may need to be incorporated into the overall project budget and schedule. Accordingly, accounting for changes can generate still further information during the course of a construction project. In general, coordinating, tracking, and recording information related to changes requires a substantial amount of time and effort among the various stakeholders, and can be a considerable challenge.

Another common source of information during construction are requests for information, or RFIs, that are generated by one of the stakeholders involved in construction. RFIs are used to clarify ambiguities, answer questions, and fill information gaps that occur during the construction process, sometimes resulting in change orders. A typical scenario for creating an RFI is when a subcontractor or superintendent requires specific information from the project's architect or engineer to complete an activity or task. For example, a project drawing might be unclear, a requirement may be vague, a product specification might be outdated, inaccurate, or incomplete, or a field-driven change order may require additional input from the architect or engineer. In such cases, an RFI is generated and responsibility for answering the RFI is assigned. Once answered, the response to the RFI is recorded. A given construction project might generate hundreds of RFIs, some of which may result in change orders. Accordingly, tracking of outstanding RFIs and their timely completion is important to prevent miscommunication, project delays, and/or rework.

Near the end of the construction phase, punch lists are generally created to list the items on the project that must be corrected or otherwise completed before the project is closed out. A given punch list item might be assigned to, and require a response from, any of the subcontractors who performed work on the project. In many cases, final inspections and certifications must be carried out for various systems and equipment within the project. For instance, a building's fire safety system may need to satisfy a city inspection, while other aspects of the building may be subject to inspection for compliance with building codes established by other governing authorities (e.g., the International Building Code). The timeliness of carrying out such inspections and the passing or failing of such inspections can have a substantial impact on a construction project's schedule, costs and overall success.

Eventually, the construction phase is completed and the project moves to a closeout phase, where the owner takes control of the project. Typically, this involves the handover of a substantial amount of information from the stakeholders involved in the construction phase to the owner regarding the finished state of the project. For instance, this information may include as-built drawings, all RFIs and changes orders created during construction and their resolution, punch list details, final inspection records, etc. As detailed above, this universe of information can be substantial.

It should be understood that the brief description of a typical construction project above represents one possible example and discusses only some of the many different sources of information that may exist for a given project.

In view of the above, it will be appreciated that the scope and complexity of construction projects of all types and sizes creates an ever-present environment of uncertainty and risk, particularly during the execution stage. Risks such as weather issues, design issues, safety concerns, quality concerns, budgetary concerns, payment issues, and project delays, to name a few, can appear in various different forms at any stage of the construction process. These and many other risks have the potential to adversely impact project performance by compromising quality and safety, increasing costs, and/or delaying project completion. Every day on construction sites, teams are coordinating hundreds of subcontractors, managing thousands of open issues, and navigating constant onsite changes, all of which, if not managed effectively, can increase project risk and lead to undesirable budget and schedule overruns.

Today, the construction industry as a whole suffers from various inefficiencies related to the vast amount of information associated with a given construction project. By some estimates, construction professionals spend up to 35% of their time on non-optimal activities like looking for project information and data, conflict resolution, and dealing with mistakes and rework. Other studies suggest that up to 30% of the data that is created during the design and construction phases is lost by the time the project reaches the closeout phase. Even when desired information is not lost, it can be difficult to visualize how certain items relate to one another due to a general lack of meaningful connectivity between the information. Consequently, it is also difficult to estimate how much risk might be associated with different parts of the construction project at any given time. Frequently, these inefficiencies stem from the siloed structure of much of this data.

Consider the example discussed above in which a change to a piece of mechanical equipment causes a change to a wall configuration, which in turn results in a change to the location of an electrical conduit. If the interrelationship between these items that leads to the cascading changes is not recognized relatively early on, there may be a relatively high risk that one or more of the construction professionals may install something (e.g., the electrical conduit and/or the wall) that will need to be removed and relocated. This in turn may lead to increased costs and schedule delays that could have been avoided if the interrelationship were identified relatively early in the process of making the change to the mechanical equipment design.

Such unplanned changes can also have an effect on, and be affected by, factors that are external to the construction project. For example, some or all of the subcontractors working on a given construction project may be working on multiple unrelated projects at the same time. In this regard, each subcontractor may have a carefully balanced schedule surrounding the availability of individuals, equipment, materials, and other assets across its active projects. As a result, a change on a first construction project that causes a relatively minor delay to when a subcontractor can perform their work can turn into a major delay, if the subcontractor in question is unavailable because they were already scheduled to be working on a second construction project elsewhere. This type of scheduling inter-dependency is often a significant, unpredictable cause delay.

Some possible solutions have been proposed to address these types of inefficiencies, including the use of a so-called common data environment, or CDE, which attempts to break down data silos by collecting the data generated during a construction project in a centralized digital location that all stakeholders can access. However, while this may address some of the problems related to data loss, it does not address the risks facing the construction professionals in the example above, which stems from a lack of data connectivity. In particular, the data lacks any unifying characteristic that can serve as a common denominator to link it together. For example, the data is not related by a single construction division, as it relates to changes in the electrical, finishes, and mechanical divisions. Nor are the affected aspects of the project related by a single data type, as the full scope of the changes may involve RFIs, change orders, updates to drawings, cost estimates, and project schedules, etc. Thus, even in a CDE in which all of the information may be technically available, reducing the risks associated with construction activities such as these remains a significant challenge.

To address these and other problems with existing solutions for the management of construction project information, disclosed herein is new software technology that utilizes machine-learning techniques to ingest new data that is generated throughout the construction process, assemble it into a construction knowledge graph that reflects the connectivity between different types of data, also referred to herein as data objects, and focus on what is most important based on various risks and priorities. The data objects may be connected with each other based on one or more unifying attributes, such as a physical location within a given construction project. In this regard, implementations for assembling and utilizing a construction knowledge graph using location as a unifying attribute are discussed in U.S. patent application Ser. No. 17/307,869 entitled "Construction Knowledge Graph" which is incorporated by reference herein in its entirety. Nonetheless, other criteria for connecting data objects in a construction knowledge graph are also possible, such as construction stakeholder relationships across different construction projects, among other possibilities.

The types of data objects that may be included in a construction knowledge graph as discussed herein may take various forms and may originate from various sources. For instance, construction professionals may use a plurality of computing devices, also referred to as client stations herein (e.g., smartphones, tablets, laptop computers, etc.), to generate the types of data objects discussed generally above, such as construction drawings, project schedules, RFIs, change orders, inspection reports, invoices and payments, lien waivers, and so on. This information may be collected by a back-end computing platform that creates and maintains the construction knowledge graph. Further, each construction project itself may be included as a node in the construction knowledge graph, as may each of the companies and construction professionals that are involved with the project.

Still further, the back-end computing platform or one or more client stations in communication with the back-end computing platform may be configured to search publicly available records for additional data objects that may be related to the construction project. Such publicly available data objects may include information related to construction permits issued by permitting agencies, professional licenses issued by licensing agencies, liens recorded with a city or county recorder's office, worker compensation claims or bankruptcy filings available from courts or other administrative agencies, among various other possibilities. These types of data objects may be added to the construction knowledge graph and used to evaluate risk and develop insights, as discussed further below.

As more data objects are assembled in this way (i.e., as nodes in the construction knowledge graph connected by edges signifying respective relationships), additional machine-learning techniques may be utilized to identify, based on actual construction project outcomes observed over time, certain of types of data objects or combinations of data objects in particular circumstances that are correlated with negative results, such as schedule delays, budget overruns, safety issues, payment delays, and so on. In this regard, data across numerous ongoing and completed construction projects may be analyzed, spanning one or more construction knowledge graphs. Eventually, it may be possible to develop one or more benchmarks to quantify how much risk is associated with a given data object, as well as the type of risk that may be implicated.

For example, a computing platform may apply the machine-learning techniques noted above and determine that a certain type of data object, or combination of data objects (e.g., an RFI related to a specific building element), tends to be associated with a relatively high risk to a project budget, although relatively low risk to the project schedule or project safety. Risk quantification of this kind may be represented on a relative scale, such as a risk score from 0-100, among other possibilities (e.g., a green/yellow/red color-coded scale, etc.). In this example, the RFI may be associated with a relatively high risk score of 75, due largely to its potential impact on the project budget.

It will also be appreciated that the risk associated with a given data object might change over time as the construction knowledge graph associated with construction project is updated. For example, the example RFI above might not be associated with a significant schedule risk if the RFI originates relatively early in the construction project, when the computing platform applying the machine-learning techniques noted above may infer that there is enough time to resolve the RFI without impacting the project schedule. On the other hand, if the same RFI is generated later in time during the construction phase or remains unresolved until the later time, the computing platform may determine, based on the connectivity of the RFI to other data objects in the construction knowledge graph (e.g., representing work that has already been completed), that a relatively high risk to the project schedule exists in addition to the budget risk, and perhaps that the budget risk has increased. Accordingly, the risk score associated with the RFI may be increased to a number above 75.

Further, it will also be appreciated that an aggregate risk score may be estimated for a construction project based on the combined effect of the individual risk events that are present on the project at any given time. This type of project risk score may be normalized based on project size and project type, among other factors. For instance, relatively few data objects associated with a high risk score may be spread out across a large construction project such that their impacts to the project are isolated (e.g., they do not compound with each other), such that the overall risk score for the project as a whole remains relatively low. On the other hand, numerous data objects that are associated with relatively low to moderate individual risk scores may be concentrated on a relatively small construction project, such that their combination results in an overall risk score for the project that is estimated to be relatively high. Other examples are also possible. In this way, a construction project risk score may provide an approximation of the real-time health of the project.

In a similar way, a respective risk score may be estimated for individual construction entities (e.g., a project owner, an engineering firm, a general contractor, a subcontractor, etc.) based on their level of connectivity to various risk events in the construction knowledge graph. In this regard, the construction knowledge graph may include additional data objects that are associated with a risk score that represents a payment risk associated with a given entity. How a data object representing a payment risk impacts an entity's risk score may depend on the nature of the entity's relationship to the data object in the construction knowledge graph (e.g., the connection type and connection distance between the entity and the data object).

To illustrate with an example, a notice of intent to lien (also referred to herein as a lien notice), which is a data object that may be associated with relatively high risk, may be directed to a general contractor for work performed by a subcontractor on a construction project. This may be a relatively strong signal that the general contractor's payment risk is high, and thus the general contractor's risk score may be relatively high. The risk score of a subcontractor on the construction project that was hired to perform work for the general contractor may be affected as well, due to the subcontractor's connectivity to the general contractor in the construction knowledge graph. However, the effect of the notice of intent to lien on the subcontractor's risk score (e.g., the weight afforded to the lien notice) may be less than the effect on the general contractor. Notably, this risk associated subcontractor may not be captured by an analysis that only examines the subcontractor's transactions and activities on the construction project. Extending further, the risk score of a material supplier on the construction project that provides materials to the subcontractor may be affected by the lien notice as well, but by a still lesser amount than the subcontractor's risk score was affected, and so on.

Accordingly, a construction knowledge graph may facilitate analyzing risk for construction projects and construction entities using a "blast radius" approach, where the risk associated with a given data object may affect other data objects across multiple connections, or "hops," in the graph, but where the effect generally decreases as the degree of separation from the risk event increases. In line with the discussion above, a computing platform may utilize one or more machine-learning techniques to quantify these types of risk relationships within the construction knowledge graph. Further, the new technology discussed herein may help construction professionals to better recognize and mitigate risks during the course of a construction project by suggesting actions that the construction professional may take to reduce those risks.

As another example, a material supplier may have difficulty fulfilling an obligation to deliver a particular type of material to a construction project on time due to a material shortage in the region, which may result in a delay and an increased schedule risk for the construction project. In this situation, the construction knowledge graph may facilitate the identification of increased schedule risk for other construction projects that (i) are located in the same region, and (ii) will rely on the material in question to complete the project, and may notify construction professionals associated with the other projects accordingly.

In line with the discussion above, the disclosed technology may be implemented as one or more software applications that facilitate the creation and management of data during the course of a construction project, some examples of which may include the types of software applications developed by Procore Technologies. Further, in practice, the computing platform in which the disclosed technology is incorporated may take the form of a software as a service ("SaaS") application that comprises a front-end software component running on numerous user client stations and a back-end software component running on a back-end computing platform that is accessible to the user client stations via a communication network such as the Internet. In some implementations, the insights discussed herein may be provided in the form of a data as a service ("DaaS") model, which may utilize one or more of APIs, event streams, email alerts, and the like.

Accordingly, in one aspect, disclosed herein is a method that involves a computing platform (i) receiving one or more data objects related to a construction project, (ii) adding the received one or more data objects to a construction knowledge graph as respective nodes that are connected to one or more other respective nodes that represent one or more other data objects, (iii) determining, via one or more machine-learning models trained using historic construction project data, a first risk score for a first data object of the one or more data objects, (iv) determining, via the one or more machine-learning models, a second risk score for a second data object, wherein the second risk score is based at least in part on (a) the first risk score for the first data object and (b) a degree of separation between the first data object and the second data object in the construction knowledge graph, (v) based on the second risk score for the second data object, automatically generating a suggested action to be taken with respect to the first data object, wherein completion of the suggested action will lower the second risk score for the second data object, and (vi) causing an indication of the suggested action to be displayed at a client station of a user associated with the construction project.

In some example embodiments, determining the physical location within the construction project to which the received data asset is related may involve identifying, within the data asset, an indication of at least one of the one or more other data assets, where the at least one of the one or more other data assets is related to the physical location.

Further, in example embodiments, at least some of the one or more other data objects are related to one or more other construction projects.

Further yet, in example embodiments, the method may further involve determining that the second risk score for the second data object exceeds a threshold risk score.

Still further, in some example embodiments, automatically generating the suggested action to be taken may involve automatically generating the suggested action to be taken based on determining that the second risk score for the second data object exceeds the threshold risk score.

Still further, in some example embodiments, the first data object may include a request for information (RFI) related to the construction project, the second data object may include a project schedule for the construction project, and the suggested action may include a suggestion to respond to the RFI within a given period of time.

Still further, in some example embodiments, the second data object may correspond to a construction service provider and the method may further involve automatically disabling a client station associated with the construction service provider from performing a given function via the computing platform based on determining that the second risk score for the second data object exceeds the threshold risk score.

Still further, in some example embodiments, the first data object may include a notice of intent to lien, where the construction service provider is a recipient of the notice of intent to lien, and where automatically disabling the client station associated with the construction service provider from performing a given function includes automatically disabling the client station from submitting bids for one or more new construction projects.

Still further, in some example embodiments, the one or more machine-learning models include a second one or more machine-learning models, where adding the received one or more data objects to the construction knowledge graph as respective nodes that are connected to one or more other respective nodes that represent the one or more other data objects includes (a) determining, via a first one or more machine-learning models, a respective physical location within the construction project to which each of the received one or more data objects is related, (b) associating the received one or more data objects with the respective physical locations, and (c) based on the respective physical locations, determining respective relationships between the received one or more data objects and the one or more other data objects.

In another aspect, disclosed herein is a computing platform that includes a network interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 3 depicts an example flow chart that may be carried out to facilitate creation of a construction knowledge graph used to identify and mitigate risk in a construction project.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

As one possible implementation, this software technology may include both front-end client software running on one or more client stations that are accessible to client users of the software technology and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform (e.g., a native software application). The software technology disclosed herein may take other forms as well.

Figure 1:
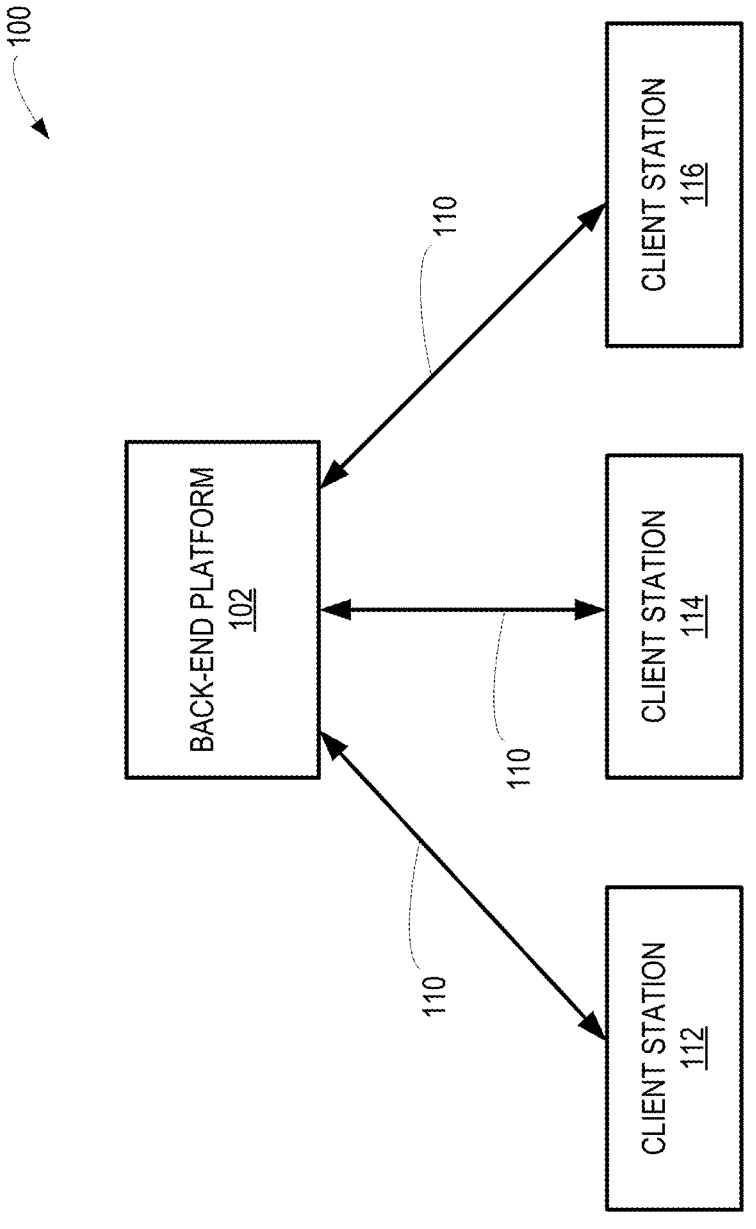
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as three client stations 112, 114, and 116.

In general, back-end computing platform 102 may comprise one or more computing systems that have been provisioned with software for carrying out one or more of the computing platform functions disclosed herein, including but not limited to functions related to outputting associated data and/or instructions that define the visual appearance of a front-end interface (e.g., a graphical user interface (GUI)) through which the data is to be presented on the one or more client stations. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the computing platform functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the computing platform functions disclosed herein. Other implementations of back-end computing platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities. In some implementations, information from the back-end computing platform 102 may be delivered directly to another back-end platform that provides a separate SaaS or DaaS application.

As further depicted in FIG. 1, back-end computing platform 102 is configured to communicate with one or more client stations 112, 114, 116 over respective communication paths. Each communication path between back-end computing platform 102 and one of client stations 112, 114, 116 may generally comprise one or more communication networks and/or communications links, which may take any of various forms. For instance, each respective communication path with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end computing platform 102 may be wireless, wired, or some combination thereof, and may carry data according to any of various different communication protocols. Although not shown, the respective communication paths with back-end computing platform 102 may also include one or more intermediate systems. For example, it is possible that back-end computing platform 102 may communicate with a given client station 112, 114, 116 via one or more intermediary systems, such as a host server (not shown). Many other configurations are also possible.

Although not shown in FIG. 1, back-end computing platform 102 may also be configured to receive data from one or more external data sources that may be used to facilitate some of the functions discussed herein. For example, the back-end computing platform 102 may be configured to ingest data objects from external data sources, such as data objects that are generated by the front-end client stations 112, 114, 116, data objects from one or more data providers, or one or more sources of publicly available information from which the back-end computing platform 102 may be configured to pull information. Other possibilities also exist.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
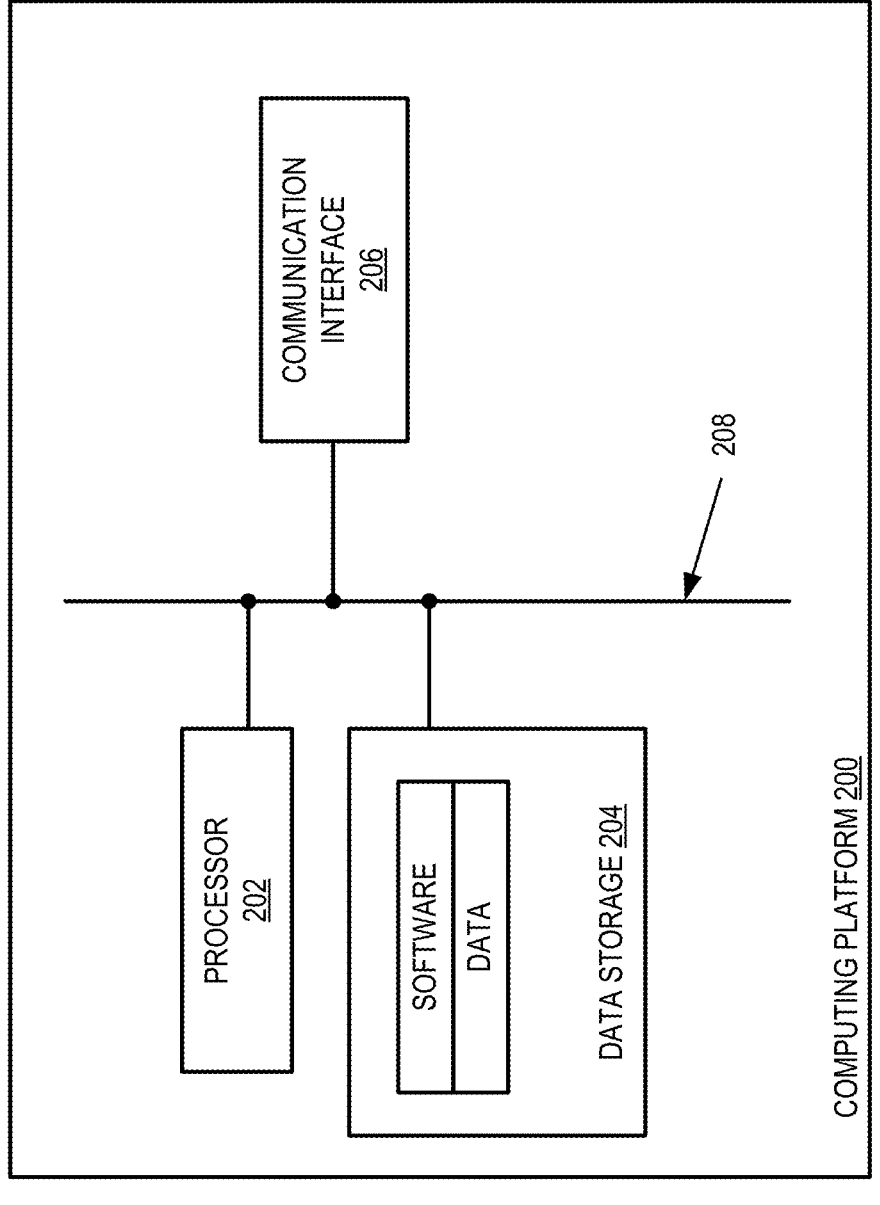
FIG. 2 depicts an example computing platform that may be configured to carry out one or more of the functions of the present disclosure.

FIG. 2 is a simplified block diagram illustrating some structural components that may be included in an example computing platform 200, which could serve as back-end computing platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., micro-controllers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that platform 200 is configured to perform some or all of the disclosed functions and (ii) data that may be received, derived, or otherwise stored, for example, in one or more databases, file systems, or the like, by platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may facilitate communications according to any of various communications protocols, examples of which may include Ethernet, Wi-Fi, cellular network, serial bus (e.g., Firewire, USB 3.0, etc.), short-range wireless protocols, and/or any other communication protocol that provides for wireless and/or wired communication, among other possibilities. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or track-pad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE FUNCTIONALITY

As discussed above, the disclosed technology is generally directed to a new approach that utilizes machine-learning models to create and maintain a construction knowledge graph that connects data objects generated during a construction project, determine the risk (e.g., a risk score) associated with the data objects based in part on their connection to other data objects in the construction knowledge graph, and generate recommendations (e.g., alerts) to users for how to reduce the risk associated with the data objects.

Turning to FIG. 3, a flow chart 300 is shown that includes example operations that may be carried out to facilitate the creation of a construction knowledge graph used to identify and mitigate risk in a construction project. The example operations will be discussed with reference to FIG. 4, which depicts a block diagram of an example computing platform 400 that may carry out the example operations. In this regard, the computing platform 400 may be similar to the back-end computing platform 102 of FIG. 1 and/or the computing platform 200 of FIG. 2.

Figure 4:
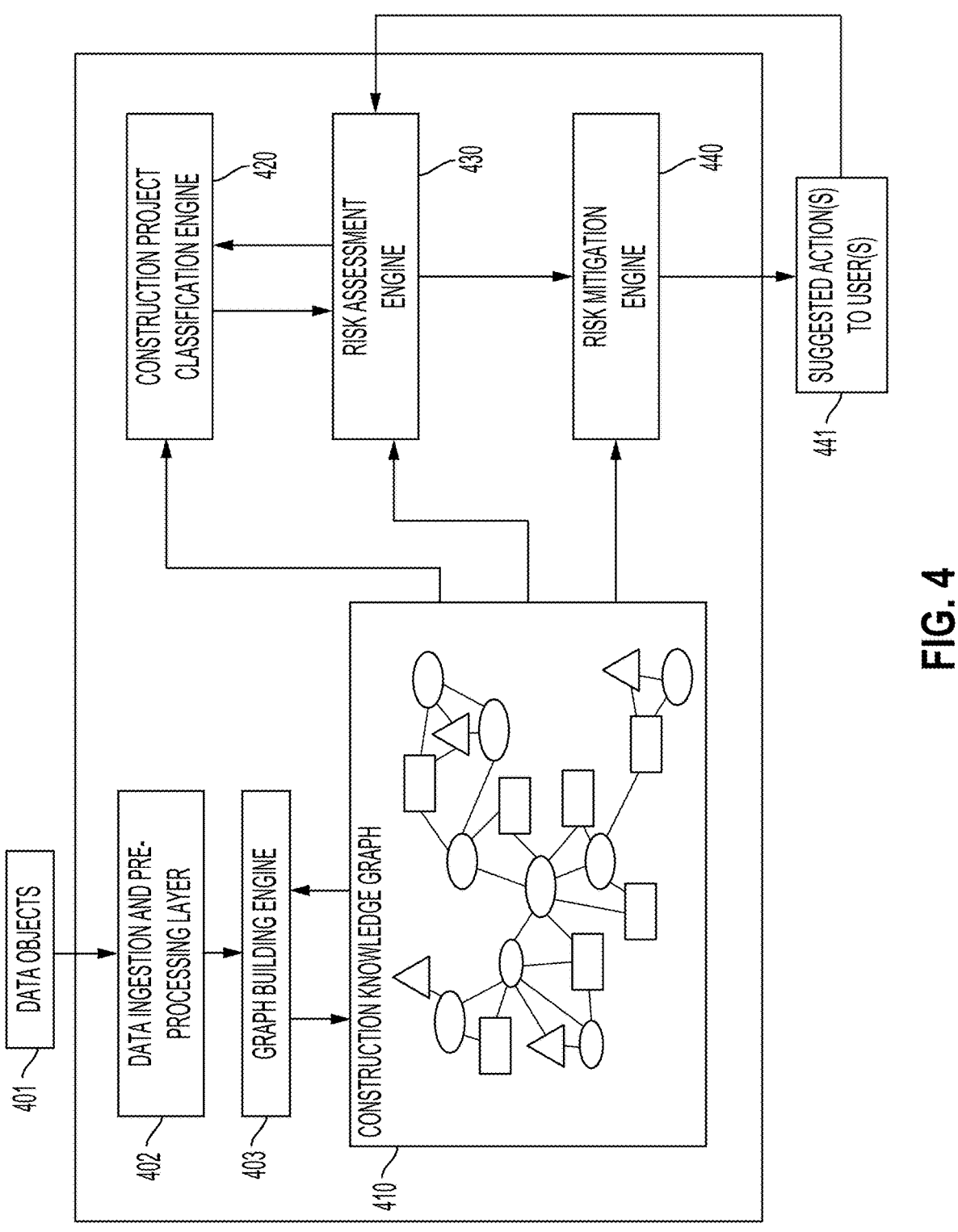
FIG. 4 depicts a simplified block diagram of a computing platform and example data flows related to quantifying and mitigating risk in a construction project.

At block 302, the computing platform 400 may receive one or more data objects related to a construction project, shown as data objects 401 in FIG. 4. As discussed above, the data objects 401 may correspond to numerous different types of information that are generated during the course of a construction project and may take various forms. As just some examples, the data objects 401 may include a construction drawing, a cost estimate, an RFI, an observation or inspection report, an image captured by an onsite camera, an invoice, payment confirmation, or other payment related event (e.g., a payment delay, a lien notice, a lien filing, a bankruptcy, etc.) among other possibilities. In some cases, the data objects 401 may originate from a front-end client station, such as the client station 112 in FIG. 1, where a user may input information to the client station 112 to create the data objects 401, which are then provided to the computing platform 400.

As another possibility, the data objects 401 may originate from data sources that are not part of the example network configuration shown in FIG. 1. For instance, the computing platform 400 may be configured to import data objects related to the construction project that were obtained from third-party data providers, or that were retrieved from publicly available data sources. These may include data objects such as construction permits (e.g., stormwater discharge permits, building permits, etc.), certificates of occupancy, professional license renewals, expirations, and/or suspensions, liens (e.g., mechanic's liens, tax liens, bond claims, etc.) and lien waivers, worker compensation claims or bankruptcy filings, insurance certificates, safety violations (e.g., Occupational Safety and Health Administration (OSHA) violations), among others.

As shown in FIG. 4, the computing platform 400 may receive the data objects 401 via a data ingestion and pre-processing layer 402. In this regard, the data ingestion and pre-processing layer 402 may take various forms, including one or more data ingestion tools that process and prepare the incoming data objects 401 for use by other components of the computing platform 400. As one example, pre-processing may take the form of unsupervised or supervised Natural Language Processing ("NLP") techniques that analyze user-inputted data in a way that enables the different software engines of the computing platform 400 (discussed further below) to better "understand" the overall context of the data. Such NLP techniques may include, as some nonlimiting examples, identifying and extracting keywords and/or key features from the raw text included in user-inputted data, correcting any spelling and/or grammatical errors, unification, non-ascii character removal, stop word removal, lemmatization, and sentiment analysis. Other pre-processing operations are also possible.

At block 304, the computing platform 400 may add the received one or more data objects 401 to a construction knowledge graph as respective nodes that are connected to one or more other respective nodes that represent one or more other data objects. As shown in FIG. 4, this operation may be carried out by a graph building engine 403 of the computing platform 400, which may identify relationships between data objects that are added to the construction knowledge graph. In some examples, the data objects themselves may include an explicit indication of their relationship to other data objects in the construction knowledge graph, which is shown schematically in FIG. 4 as construction knowledge graph 410. For instance, an RFI or an invoice related to a given construction project may name the entities that both originated and received the RFI or invoice. Further, an RFI might refer to a specific construction drawing or building element (e.g., a door), thus providing an indication of the RFI's relationship to the node(s) in the construction knowledge graph 410 that represent the construction drawing or building element.

Further, the graph building engine 403 may apply one or more supervised machine-learning models that may be trained, using historic construction data and/or user feedback, to infer relationships between data objects that are added to the construction knowledge graph 410. As one possibility, the graph building engine 403 may use location within the construction project as a unifying attribute to establish relationships between data objects. For example, the graph building engine 403 may utilize a virtual coordinate system that is established during the creation of the design plans for the construction project. Accordingly, each physical object represented within the design plans may be associated with the location(s) corresponding to its particular geometry within the virtual coordinate system. For example, a wall may be associated with a set of (x,y,z) values in the virtual coordinate system that correspond to the width, height, and depth of the wall. Further, each object within the design plans may be associated with a globally unique identifier (GUID) that may be used to identify the object. In this way, the physical objects represented in the design plans may form a baseline set of location-associated data objects within the construction project.

As additional data objects are ingested by the computing platform 400, the one or more machine-learning models of the graph building engine 403 may analyze the data objects and associate them to the location(s) in the virtual coordinate system to which they are related. The one or more machine-learning models may take various forms. As one possibility, the one or more machine-learning models may be trained using historical data sets from past construction projects whose data objects have been manually curated and associated with locations within their respective projects to which they are related. In this way, the one or more machine-learning models may learn to identify a given data object's relationship to a physical location within a construction project based on information contained in the data object. For example, based on training data sets in which numerous RFIs across one or more historical construction projects are associated with physical objects and locations to which they refer, the first machine-learning algorithm may learn to recognize words and phrases within an RFI that match, or are similar to, a particular location or area of the construction project. Similar text-based correlations may be used to associate other types of data objects (e.g., change orders, inspection reports, etc.) with physical locations within the construction project as well. Various other examples of identifying location-based relationships within a construction knowledge graph are discussed in U.S. patent application Ser. No. 17/307,869, which was incorporated by reference above.

It will also be understood that the data objects 401 that are ingested by the computing platform 400, and thus the nodes that make up the construction knowledge graph 410, are not limited to data objects that are directly associated with locations in the construction project or work that is to be performed, as generally discussed thus far. For example, entities involved in the construction project (e.g., people, companies, etc.) may also be added as nodes in the graph and connected to other nodes by relationships that are identified by the graph building engine 403.

Moreover, the construction knowledge graph 410 may encompass more than one construction project and may include data objects that are related to two or more of the construction projects represented in the graph. For instance, an entity that is represented by a node in the construction knowledge graph 410, such as a general contractor, may be connected to multiple different construction projects on which they are working.

As shown in FIG. 4, the graph building engine 403 may use the current state of the construction knowledge graph 410 as an input when determining connections for newly ingested data objects 401. For example, the graph building engine 403 may determine which data objects that are already represented as nodes in the construction knowledge graph 410 are likely to be related to the new data objects 401. Accordingly, after incorporating the data objects 401 as nodes in the construction knowledge graph 410, the graph building engine 403 may utilize the updated construction knowledge graph 410 as an input to inform relationships of additional data objects that are added.

Further, the graph building engine 403 may be configured to identify gaps or potentially missing information in the graph. Similarly, the one or more machine-learning model of the graph building engine 403 may only be able to infer relationships for a given data object that have relatively low confidence. In these situations, the computing platform 400 may prompt one or more users via client station(s) 112, 114, 116 with a recommendation to provide the missing information or to confirm the relationship that has been identified by the graph building engine 403. Based on user feedback, the graph building engine 403 may add the appropriate nodes or connections to the construction knowledge graph 410. In addition, the graph building engine 403 may utilize the user feedback as additional input to further train the graph building engine 403.

It will be appreciated that different construction projects can vary dramatically in their size, complexity, and construction type. Even factors such as geographic location can cause two construction projects that would otherwise be very similar to be executed very differently. For this reason, the amount risk associated with the one or more data objects 401 that are added to a construction graph 410 may depend in part on the attributes of the construction project to which they are related. Further, some characteristics of a construction project may influence the amount of risk that may result from certain events, while others may not.

Thus, the computing platform 400 may include a construction project classification engine 420 that utilizes one or more machine-learning models to categorize construction projects into cohorts that have similar characteristics (e.g., characteristics that influence risk levels). In this regard, the historic construction data sets discussed above may be used as a basis for classification. For example, the machine-learning models of the construction project classification engine 420 may apply one or more dimensionality reduction techniques (e.g., principal component analysis, etc.) and/or one or more clustering techniques (e.g., k-means clustering algorithms, etc.) to group construction projects into cohorts based on their relevant similarities or differences.

Accordingly, the construction project to which the one or more data objects 401 correspond may be classified by the construction project classification engine 420 into a cohort of other, similar construction projects. In this way, the risk associated with one or more data objects 401 may be determined (as discussed below) with reference to other data objects on similar construction projects.

At block 306, the computing platform 400 may determine, via one or more machine-learning models trained using historic construction project data, a first risk score for a first data object of the one or more data objects 401. As shown in FIG. 4, this operation may be carried out by a risk assessment engine 430, which may receive input from both the construction knowledge graph 410 and the construction project classification engine 420.

The one or more machine-learning models of the risk assessment engine 430 may take various forms and may be trained in various ways. As one example, negative outcomes within historic construction data sets (e.g., schedule delays, budget overruns, safety issues, repeated work, payment delays, etc.) may be manually identified and quantified based on their severity. For example, the severity of a negative outcome may be assigned a value on a relative scale, such as 0-100. Further, a construction knowledge graph that represents the connectivity of data objects in the historic construction data may be assembled (e.g., by the graph building engine 403).

Using the quantification of negative outcomes and the connectivity of data objects in the construction knowledge graph as training data, one or more prediction models may be trained (e.g., a polynomial regression model, a lasso regression model, etc.). As a result of this training, the one or more machine-learning models of the risk assessment engine 430 may identify certain data objects, or combinations of data objects, that are predictive of negative outcomes. This, in turn, may provide a basis to assign these data objects a risk score. As above, risk scores may be quantified on a relative 0-100 scale depending on the strength of the correlation between the data object(s) and the negative outcome (perhaps also contemplating the severity of the negative outcome).

The risk assessment engine 430 may be trained in this way with numerous historic construction data sets within a given cohort of similar construction projects. As a result, a meaningful benchmark may be established by which a risk score associated with a given data object can be understood and compared with risk scores associated with other data objects. In this regard, it will be appreciated that any relative scale may be used for risk scores, and higher risk may correspond to either a higher value or a lower value on the scale.

Accordingly, when the one or more data objects 401 are added to the construction knowledge graph 410 as shown in FIG. 4, the risk assessment engine 430 may execute the one or more machine-learning models to predict a risk score for a first data object of the data objects 401. For instance, the risk assessment engine 430 may receive an indication from the construction project classification engine 420 of the cohort of construction projects to which the first data object is related, as well as an indication of the connectivity of the first data object to other data objects in the construction knowledge graph 410. Using this information, the risk assessment engine 430 may apply the one or more regression models discussed above to determine a risk score for the first data object.

In addition to predicting a risk score for a new data object when it is added to the construction knowledge graph, the one or more machine-learning models of the risk assessment engine 430 may also be trained to predict the effect of adding the new data object on other data objects that are connected either directly or indirectly to the new data object. For example, the training data may indicate that the addition of a data object with a relatively high risk score (e.g., a lien notice or particular type of RFI) may impact the risk scores of some or all of the data objects to which it is connected in the construction graph. This "blast radius" effect may extend across multiple connections in the graph with decreasing magnitude, as mentioned above.

Accordingly, at block 308, the computing platform 400 may determine, via the one or more machine-learning models, a second risk score for a second data object in the construction knowledge graph 410, where the second risk score is based on the first risk score of the first data object and a degree of separation between the first data object and the second data object in the construction knowledge graph 410. In this regard, the second data object may be a data object that was previously added to the construction knowledge graph 410, and which is now being affected by the addition of the first data object. For instance, the second data object might be a node in the construction knowledge graph 410 that corresponds to the construction project that the first data object is associated with, or a general contractor working on the construction project.

Various examples illustrating how risk scores associated with individual data objects may affect other data objects across connections within a construction knowledge graph will be discussed below with reference to FIG. 5.

At block 310, the computing platform 400 may, based on the second risk score for the second data object, automatically generate a suggested action to be taken with respect to the first data object, where completion of the suggested action will lower the second risk score for the second data object. This operation may be carried out by a risk mitigation engine 440 as shown in connection with the suggestion action(s) 441 in FIG. 4.

A suggested action 441 generated by the risk mitigation engine 440 may take various forms and may generally correspond to an action that will reduce the risk associated with the first data object. For instance, the first data object may be an outstanding RFI that is associated with a relatively high risk score, and the suggested action 441 may be for the user to whom the RFI is directed to respond to the RFI.

The risk mitigation engine 440 may automatically generate suggested actions 441 based on various criteria. As one example, the risk mitigation engine 440 may automatically generate and maintain a list of suggested actions 441 for a given user to take that are within the user's responsibility, and the list may be ordered with the data objects having the highest risk event first (e.g., responding to RFIs, paying invoices, requesting materials). This may provide a useful reference to help the user stay aware of the tasks that are associated with the highest risk and plan their activities on the construction project accordingly.

As another example, the risk mitigation engine 440 may automatically generate a suggested action 441 if the risk score of a given data object is above a predetermined threshold value (e.g., a risk score of 50). In some cases, a data object may be initially added to the construction knowledge graph 410 with a risk score that exceeds the threshold value. In other cases, a data object may initially have a risk score below the threshold, but due to other data objects being added to the graph, the risk score may increase above the threshold. In either situation, the risk mitigation engine 440 may automatically generate a suggested action 441, which may take the form of an alert or similar notification indicating that the risk score associated with the data object exceeds the threshold.

The risk mitigation engine 440 may generate suggested actions 441 in response to other triggers as well, including in response to user requests. Other examples are also possible.

At block 312, the computing platform 400 may cause an indication of the suggested action 441 to be displayed at a client station of a user associated with the construction project. For example, the client station may be one of the client stations 112, 114, 116 shown in FIG. 1 that is running front-end software associated with the computing platform 400, and the suggested action 441 may appear in a pop-up window or other dashboard of the front-end software. Other examples, such as email, text, chat notifications and the like are also possible.

In some embodiments, data regarding a user's response to the suggested action 441 may be provided to the risk assessment engine 430 as additional training data for the one or more prediction models. For example, data indicating that the user performed the suggested action 441 with respect to a given data object may be correlated with eventual outcome data regarding the identified risk. For instance, if the suggested action 441 was intended to reduce a predicted risk to the schedule, and a negative outcome with respect to the schedule did not occur, it may reinforce the correlation that led to the initial risk score. Conversely, if the user completed the suggested action 441 but a negative outcome nonetheless still occurred, this data may be used as training data to improve the risk assessment engine 430 by discounting the effect of the given data object, and perhaps ascribing more weight to a different risk signal that may be present in the construction knowledge graph 410.

Similarly, data indicating that the user did not perform the suggested action (e.g., did not address an RFI within a recommended time frame) may be used as training data to improve the risk assessment engine 430. For instance, if a user did not perform the suggested action 441, and a negative outcome also did not occur, it may imply that the user did not think the suggested action was necessary and further, that the user was correct. As above, the data may be used as training data to improve the risk assessment engine 430 by discounting the effect of the given data object. In this situation, the risk assessment engine 430 can effectively "learn" from the user. Advantageously, these insights can then be applied by the computing platform 400 to other construction projects.

In this way, the risk assessment and mitigation technology discussed herein may function as a centralized network of construction knowledge and experience that continually improves its operation based on its use across construction projects.

Figure 5:
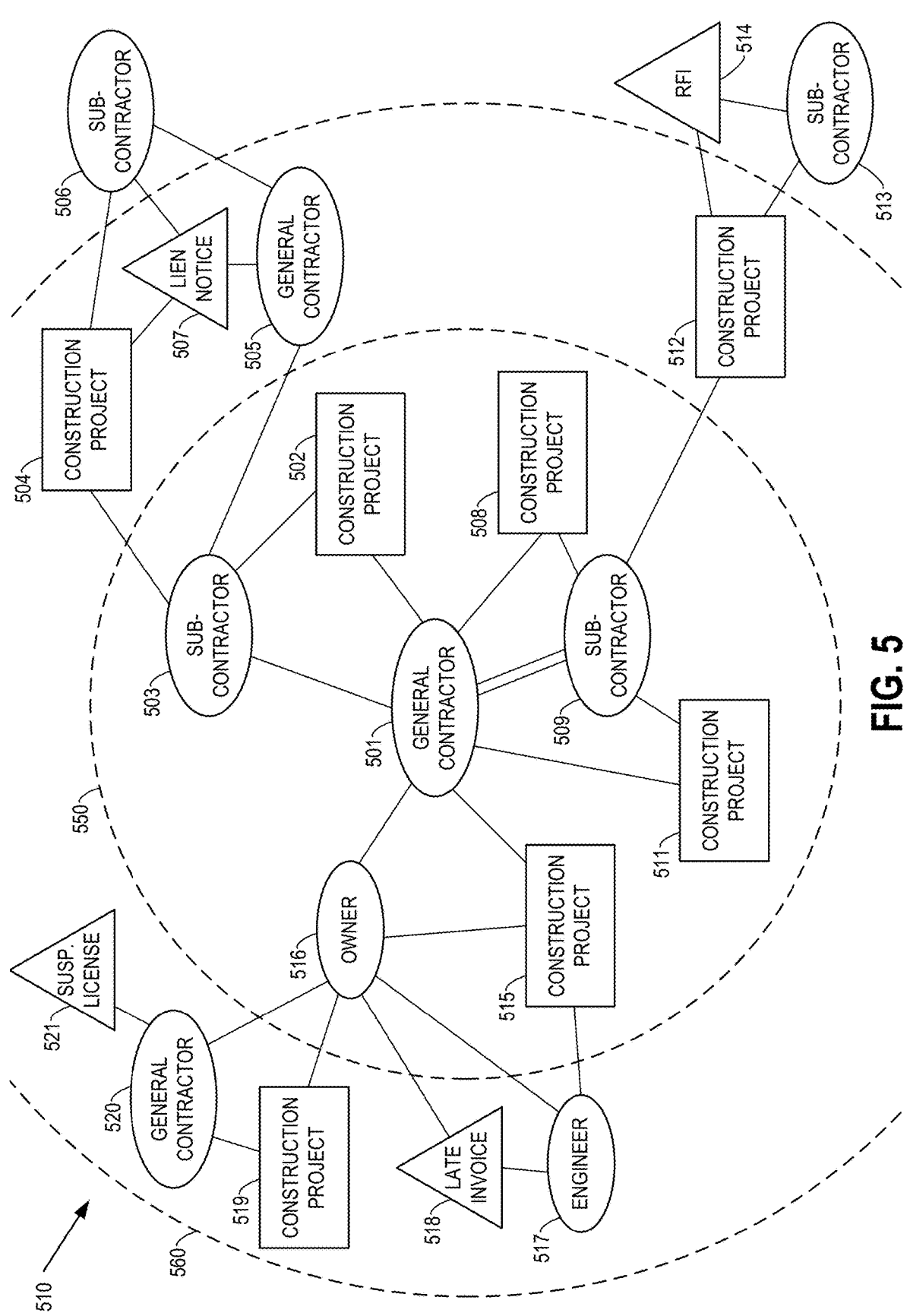
FIG. 5 depicts a schematic example of a construction knowledge graph according to one possible implementation.

Turning now to FIG. 5, a schematic example depicting a construction knowledge graph 510 is shown and will serve as the basis to describe several examples consistent with the discussion above. The construction knowledge graph 510 may be similar to the graph 410 shown in FIG. 4 and discussed above. For instance, the construction knowledge graph 510 may be created by a computing platform, such as the computing platform 400, in accordance with the operations shown in FIG. 3 and generally discussed above.

It should be understood that the construction knowledge graph 510 shown in FIG. 5 may represent only a small portion of a construction knowledge graph that may be developed, which might include substantially more nodes and connecting edges.

As shown in FIG. 5, the construction knowledge graph 510 includes nodes that correspond to data objects related to several different construction projects, with differently-shaped nodes corresponding to different types of data objects. For instance, data objects that correspond to a construction project are represented by rectangular nodes, entity-based data objects are represented by oval-shaped nodes, and informational data objects are represented by triangular nodes. Connecting the various nodes of the construction knowledge graph 510 and characterizing the relationships between the nodes are various edges. For example, an edge may characterize that one entity is "contracted to work for" another entity to which it is connected, and so on.

At the center of the construction knowledge graph 510 is a node representing a general contractor 501 that has various connections to other nodes. For example, the general contractor 501 may be responsible for work on a construction project 502 and may have hired a subcontractor 503 to perform work on the construction project 502. In the example shown in FIG. 5, the construction project 502 is not associated with any other data objects that have a significant risk score, and thus the risk to the general contractor 501 based only on these first-level connections might initially appear to be relatively low.

However, the construction knowledge graph 510 illustrates that the subcontractor 503 is also connected to a general contractor 505 in association with work to be performed on a construction project 504. Further, another subcontractor 506 is also connected to the same project and has filed a lien notice 507 against the general contractor 505 related to work performed on the construction project 504. As discussed above, the lien notice 507 may be associated with relatively high degree of financial risk, indicating the possibility of a negative financial outcome for the general contractor 505. As a result, a risk score for the general contractor 505 (e.g., determined by the risk assessment engine 430 shown in FIG. 4) may increase to reflect this risk.

In addition, risk scores for both the construction project 504 and the subcontractor 503 may also increase. For example, the risk score of the subcontractor 503 may be increased because its relationship with the general contractor 505 reflects that the subcontractor 503 is to be paid by the general contractor 505 for work performed on the construction project 504, yet the general contractor 505 is now associated with a high payment risk (i.e., it has not paid subcontractor 506). While the risk score of subcontractor 503 may not be impacted as significantly by the lien notice 507 as the risk score of the general contractor 505, it may still be affected. As another possibility, the effect of on the subcontractor 503 may amplified in some implementations, if, for example, the subcontractor is working on relatively few construction projects and the majority of them are with the general contractor 505. Other variations also exist.

Returning to the general contractor 501, it will be appreciated that the risk associated with the lien notice 507 may also affect the general contractor 501 due to its connection to the subcontractor 503. However, the effect may be less significant than the effect on the subcontractor 503 based on the degree of separation involved. In this regard, FIG. 5 illustrates a first ring 550 and a second ring 560, both of which are shown by dashed lines and generally represent the number of levels, or hops, away from the general contractor 501 a given data object is for purpose of determining the effect to the risk score of general contractor 501.

As another example, the general contractor 501 is responsible for work on two construction projects 508 and 511, and is connected to subcontractor 509 with respect to both projects. In this case, the connection between the general contractor 501 and the subcontractor 509 may be stronger, and may transfer risk signals more effectively than if they were only working together on a single construction project. In this example, the subcontractor 509 may be associated with low schedule, budget, quality, safety, and payment risks, and consequently may have a very low risk score. Just as a risk score may be negatively affected by the risk score of connected nodes, a risk score may also be positively affected by connected nodes. In this case, the risk score of the general contractor 501 may be lowered based on the strong connection to the subcontractor 509.

As shown in FIG. 5, the subcontractor 509 is also connected to another construction project 512, which in turn is connected to a subcontractor 513 working on the project who has submitted an RFI 514. In this example, although the RFI 514 may be associated with relatively high schedule and budget risks, resulting in a relatively high risk score, it may be determined (e.g., the risk assessment engine 430 may determine) that the RFI 514 corresponds to a portion of the construction project 512 (e.g., a location on the project) that does not involve the subcontractor 509. Thus, while the risk scores of both the subcontractor 513 and the construction project 512 may be affected by the RFI 514, there may be a relatively small effect on the risk score of the subcontractor 509. Further, the risk score of the general contractor 501 may not be impacted at all.

As another example, the general contractor 501 is responsible for work on a construction project 515 and is connected to the owner 516 of the construction project 515. The owner 516 is also connected to an engineer 517 who performed design work on the construction project 515. As shown in FIG. 5, the engineer 517 has submitted an invoice 518 for payment by the owner 516 that is past due. For instance, the invoice 518 may be 60-days past due. Typically, an overdue invoice at the 60-day mark may only be associated with a low to moderate payment risk (which may escalate if the invoice reaches 90-days past due, for instance). Thus, the invoice 518, if viewed in isolation, may not significantly impact the risk score of the engineer 517, owner 516 or by extension, the general contractor 501.

However, the owner 516 also owns construction project 519 and has contracted with general contractor 520 to coordinate work on the construction project 519. Further, the construction knowledge graph 510 reflects that the general contractor 520 has received a license suspension 521. For instance, the license suspension 521 may require that the general contractor 520 discontinue all work until the license suspension 521 is resolved. Accordingly, the risk score associated with the license suspension 521 may be extremely high and may have a substantial effect on the risk scores of the general contractor 520 and the construction project 519. Further, although the owner 516 is one level away from both the general contractor 520 and the construction project 519, the impact of the license suspension 521 may be so significant that its effect on the risk score of the owner 516 is only diminished slightly.

Still further, due to the license suspension 521, the owner 516 may be associated with some degree of payment risk (e.g., due to resolving the license suspension 521 and/or replacing the general contractor 520, escalating various activities to keep the construction project 519 on schedule, etc.). For this reason, the risk score associated with the invoice 518 may be increased above the typical risk score value it might otherwise have, and so on.

In some implementations, a construction knowledge graph may incorporate information regarding the outcomes of past construction projects that a given entity (e.g., a subcontractor) has worked on overtime, including the number, size(s), and type(s) of construction projects. This data may further inform a predicted risk level associated with the subcontractor in relation to its currently active projects. For instance, the data in the construction knowledge graph may indicate that the subcontractor is associated with relatively higher risk(s) (e.g., payment risk, quality risk, schedule risk) when the number and/or size of its currently active project(s) exceeds a certain threshold. Other examples incorporating the outcomes of past projects that a given entity was involved with are also possible.

Figure 6:
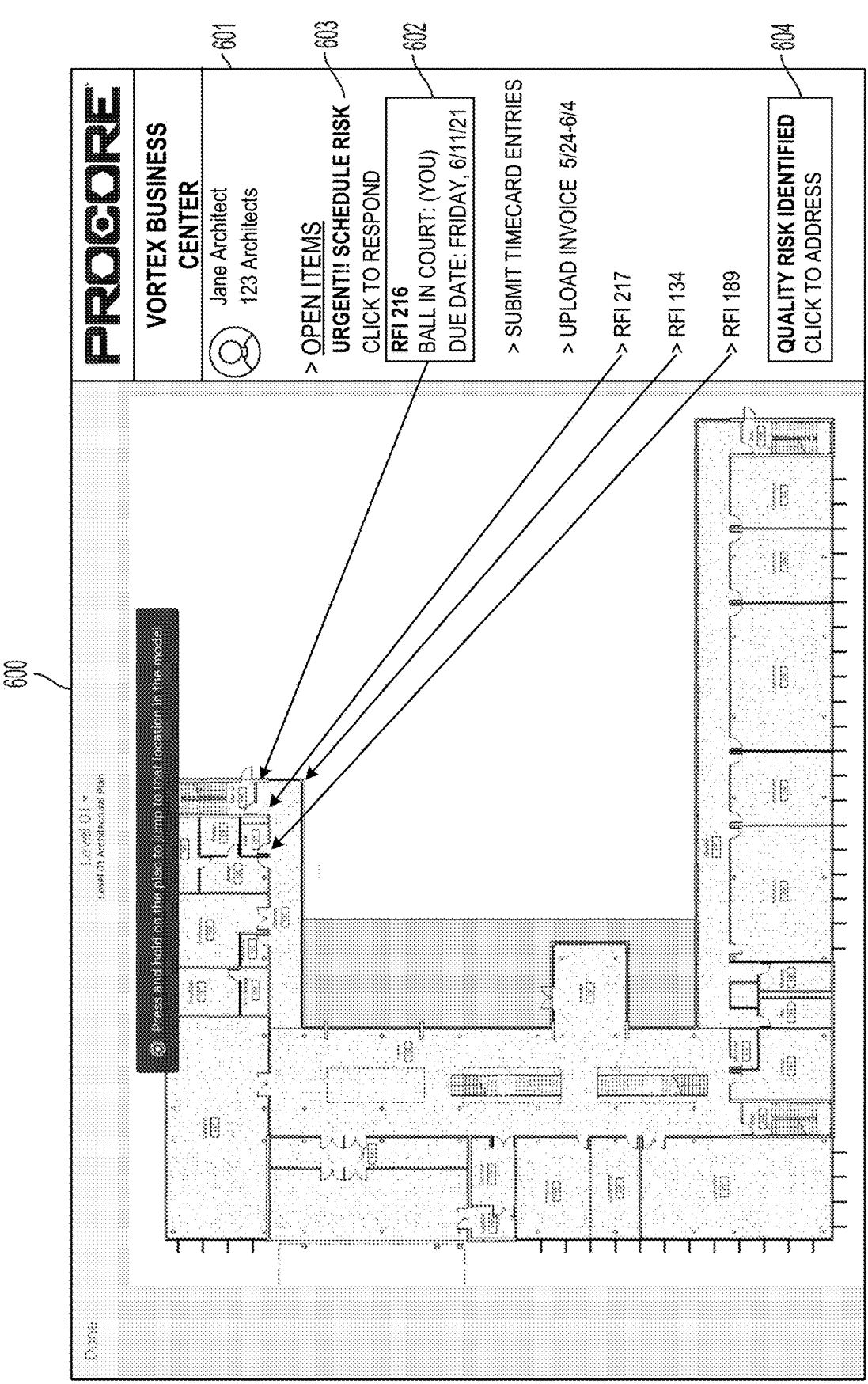
FIG. 6 depicts an example view of a GUI that may be presented to a user showing a two-dimensional construction drawing and a prioritized set of tasks for the user that are localized in the two-dimensional construction drawing.

Turning to FIG. 6, an example view of a GUI 600 is shown that may be displayed on one of the client stations shown in FIG. 1 (e.g., the client station 112). In FIG. 6, the GUI 600 depicts a visualization of a two-dimensional construction drawing for the construction project, which may be displayed via a software tool for viewing such drawings. In some implementations, the drawing viewer may be a stand-alone application running on the client station 112, as generally shown in FIG. 6. In some other implementations, the drawing viewer may be included as a plug-in or similar component that is incorporated into a different software tool, such as an estimating tool or scheduling tool. In still further implementations, a software tool might not include a drawings visualization component at all.

In the example of FIG. 6, the GUI 600 includes an information pane 601 on the right side that may include various information. For instance, the information pane 601 includes a name of the construction project, Vortex Business Center, that is shown in the construction drawings, an indication of the user of the client station 112, Jane Architect, as well as the company she works for, 123 Architects. Further, the information pane 601 includes an open items list corresponding to tasks for Jane Architect to complete with respect to the construction project.

As discussed above, a computing platform, such as the computing platform 400 shown in FIG. 4, may generate a suggested action to be taken with respect to a data object, in order to reduce the risk associated with the data object and the construction project as a whole. In FIG. 6, the computing platform 400 has caused such an indication to be displayed via the GUI 600 in relation to the RFI 602. For example, the computing platform 400 may determine that the RFI 602 has a relatively high risk score based on its potential impact to the project schedule. Thus, an indication 603 may be displayed that alerts the user to the schedule risk and suggests that she click on the indication to respond to the RFI 602. For instance, clicking on the indication as suggested may direct the user to an interface (e.g., an RFI management tool) where she may enter a response to the RFI 602.

In addition, because the information pane 601 in the example of FIG. 6 is presented in connection with a drawing visualization tool, an indication of the location of RFI 602 within the construction project may also be displayed. For instance, the location of RFI 602 is shown by an arrow in FIG. 6, although other implementations are also possible. Further, the open items list for the user also includes several additional RFIs having a lower priority on the list. Like the RFI 602, the locations of each of these RFIs within the construction project is also indicated. As will be appreciated from the discussion above, this type of visualization may be enabled by the construction knowledge graph 410 that was created by the computing platform 400, and in particular the graph building engine 403, that assigned a physical location to each of the RFIs when there were added to the construction graph. Advantageously, this type of visualization may allow the user to quickly and easily identify areas of the project that need attention.

In this example, all of the RFIs assigned to the user are concentrated in the same general location of the construction project. Based on the number and location of the RFIs, the risk assessment engine 430 of the computing platform 400 may determine that a quality risk exists at this location of the construction project. For example, the risk assessment engine 430 may determine that the number of RFIs is higher than a threshold number that is associated with low risk for a given area (e.g., defined by (x,y,z) coordinates), a given room, or a given drawing sheet, etc. Accordingly, the computing platform 400 may generate one or more suggested actions (e.g., responding to the RFIs), which the user may view by clicking on the notification 604 that is presented in the information pane 601.

As noted above, the information pane and open items list shown by way of example in FIG. 6 need not be tied to a drawing visualization tool. In implementations where a drawing visualization is not present, the arrows indicating the physical location associated with the RFIs may be omitted, however the notification 604 regarding the quality risk may remain.

As another example, a given RFI might be associated with multiple locations in a construction project, perhaps across several different construction drawings. Similar to a situation in which numerous RFIs are associated with a single location, a single RFI associated with numerous locations may indicate a higher than normal risk to the construction project. Other examples are also possible.

In addition to using risk scores to anticipate and avoid quality issues, schedule delays, budget overruns, and other negative results during the course of construction, the computing platform 400 may use risk scores as a metric by which to disable a client station associated with a given entity from performing a given function via the computing platform 400. For example, an owner or other stakeholder might restrict bidding on a given job to contractors that are below a maximum risk threshold.

Figure 7:
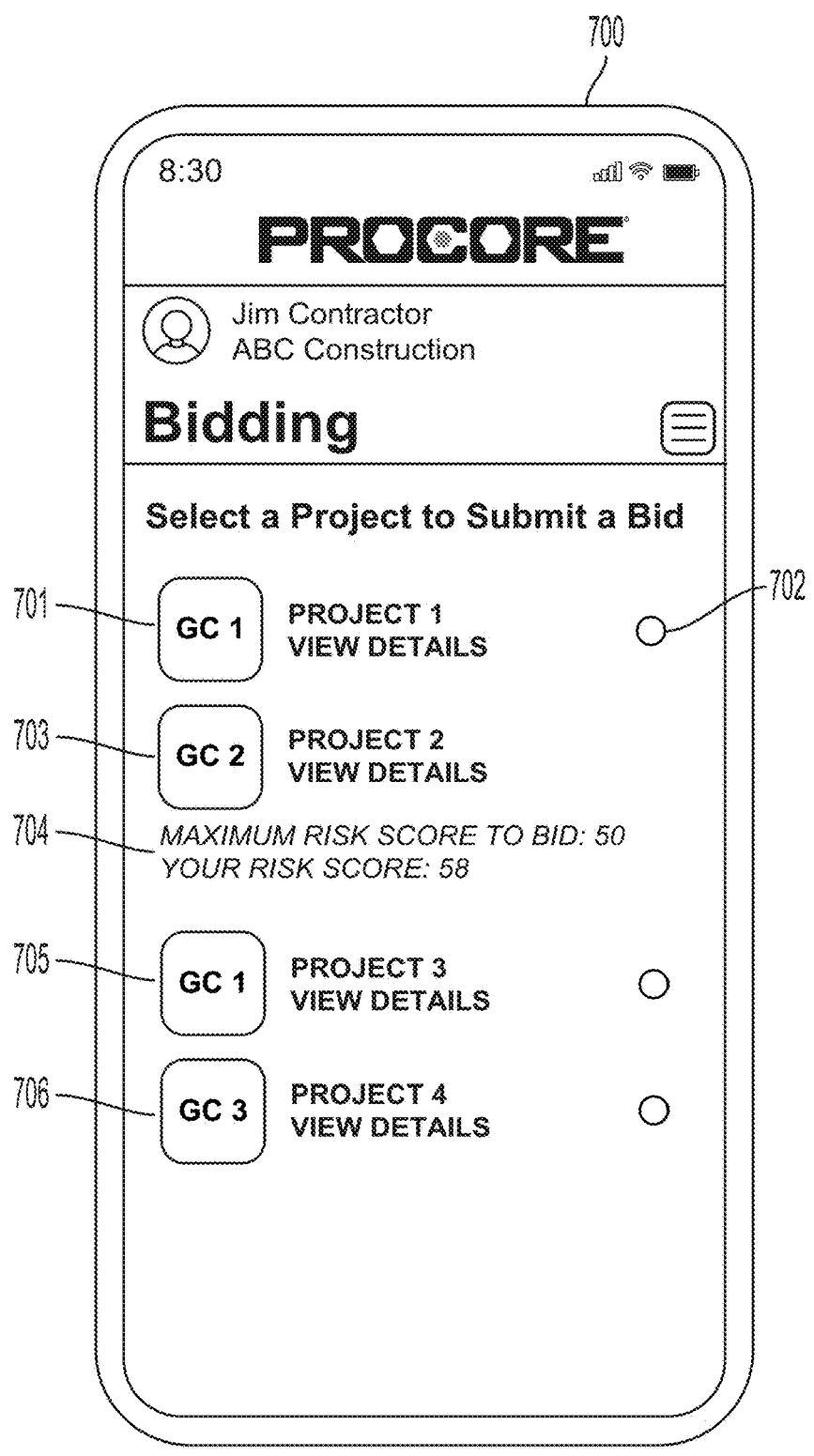
FIG. 7 depicts an example view of a GUI that may be presented to a user showing a project bidding screen.

Such an example is shown in FIG. 7, which illustrates an example view of a GUI that may be displayed on a mobile device 700. In this regard, the mobile device 700 may correspond to one of the client stations 112, 114, 116 shown in FIG. 1. As shown in FIG. 7, the mobile device 700 displays an indication of the user of the mobile device 700, Jim Contractor, as well as the company he works for, ABC Construction. Further, the mobile device 700 displays a bidding tool that allows the user to select various different construction projects (e.g., construction projects filtered based on their proximity to the user's company) in order to submit a bid for the project. Accordingly, a list including construction projects 701, 703, 705, and 706 is shown.

Next to the construction project 701 in the list is a radio button 702 that the user may select in order to begin the process of submitting a bid for construction project 701. Similar buttons appear for construction projects 705 and 706, however no button is present next to construction project 703. Rather, the mobile device 700 displays an indication 704 informing the user that construction project 703 has a maximum risk score requirement to submit a bid, and that the user's company does not meet the threshold.

In view of the above, it will be appreciated that risk scores may also be utilized by the computing platform 400 as a metric by which to enable a client station associated with a given entity to perform a given function via the computing platform 400. Still further, risk scores may be used as a metric to determine whether an entity may access other construction-related services that are facilitated by the computing platform 400. For example, a sufficiently high risk score may allow an entity to qualify or pre-quality (e.g., during a pre-qualification process as noted above) for certain types of construction financing and construction-related insurance. Various other examples are also possible.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:

1. A computing platform comprising:
a network interface;
at least one processor;
non-transitory computer-readable medium; and
program instructions stored on the non-transitory computer-readable medium that are executable by the at least one processor such that the computing platform is configured to:
  receive one or more data objects related to a first construction project;
  add the received one or more data objects to a construction knowledge graph as respective nodes that are connected, via respective edges, to one or more other respective nodes that represent one or more other data objects, wherein the construction knowledge graph includes at least one path along two or more edges and at least one node between a given pair of nodes that respectively represent different construction projects;
  determine, via one or more machine-learning models trained using historic construction project data, a first risk score for a first data object of the received one or more data objects;
  determine, via the one or more machine-learning models, a second risk score for a second data object that (i) corresponds to a construction service provider and (ii) is related to a second construction project different from the first construction project, wherein the second risk score is based at least in part on (i) the first risk score for the first data object and (ii) a degree of separation between a first node in the construction knowledge graph representing the first data object and a second node in the construction knowledge graph representing the second data object, wherein the degree of separation is based on a number of edges between the first node and the second node in the construction knowledge graph;
  determine that the second risk score for the second data object exceeds a threshold risk score associated with the second construction project; and based on determining that the second risk score for the second data object exceeds the threshold risk score, automatically disable a client station associated with the construction service provider from performing a given function via the computing platform.

2. The computing platform of claim 1, wherein at least one of the one or more other data objects is related to the second construction project.

3. The computing platform of claim 1, wherein the first data object comprises a notice of intent to lien, wherein the construction service provider is a recipient of the notice of intent to lien, and wherein the program instructions that are executable by the at least one processor such that the computing platform is configured to automatically disable the client station associated with the construction service provider from performing a given function via the computing platform comprise program instructions that are executable by the at least one processor such that the computing platform is configured to:
  automatically disable the client station from submitting bids for one or more new construction projects.

4. The computing platform of claim 1, wherein the one or more machine-learning models comprise a second one or more machine-learning models, and wherein the program instructions that are executable by the at least one processor such that the computing platform is configured to add the received one or more data objects to the construction knowledge graph as respective nodes that are connected, via respective edges, to one or more other respective nodes that represent the one or more other data objects comprise program instructions that are executable by the at least one processor such that the computing platform is configured to:
  determine, via a first one or more machine-learning models, a respective physical location within the first construction project to which each of the received one or more data objects is related;
  associate the received one or more data objects with the respective physical locations; and
  based on the respective physical locations, determine respective relationships for establishing respective edges between the received one or more data objects and the one or more other data objects.

5. The computing platform of claim 1, further comprising program instructions stored on the non-transitory computer-readable medium that are executable by the at least one processor such that the computing platform is configured to:
  determine, via the one or more machine-learning models, respective second risk scores for at least some other data objects based at least in part on (i) the first risk score for the first data object, (ii) respective degree of separation between the first node in the construction knowledge graph representing the first data object and respective other nodes in the construction knowledge graph representing the at least some other data objects within the construction knowledge graph, and (iii) one or both of a type of the first data object or respective type of respective ones of the at least some other data objects.

6. The computing platform of claim 1, wherein the number of edges between the first node and the second node includes:
  at least a first edge between the first node and a third node, and at least a second edge between either (i) the second node and the third node or (ii) the second node and another different node.

7. The computing platform of claim 1, wherein:

the first data object is added to the construction knowledge graph after the second data object; and the first risk score determined for the first data object causes the second risk score determined for the second data object to exceed the threshold risk score.

8. A non-transitory computer-readable medium, wherein the non-transitory computer-readable medium is provisioned with program instructions that, when executed by at least one processor, cause a computing platform to:

receive one or more data objects related to a first construction project;

add the received one or more data objects to a construction knowledge graph as respective nodes that are connected to one or more other respective nodes that represent one or more other data objects, wherein the construction knowledge graph includes at least one path along two or more edges and at least one node between a given pair of nodes that respectively represent different construction projects;

determine, via one or more machine-learning models trained using historic construction project data, a first risk score for a first data object of the received one or more data objects;

determine, via the one or more machine-learning models, a second risk score for a second data object that (i) corresponds to a construction service provider and (ii) is related to a second construction project different from the first construction project, wherein the second risk score is based at least in part on (i) the first risk score for the first data object and (ii) a degree of separation between a first node in the construction knowledge graph representing the first data object and a second node in the construction knowledge graph representing the second data object, wherein the degree of separation is based on a number of edges between the first node and the second node in the construction knowledge graph;

determine that the second risk score for the second data object exceeds a threshold risk score associated with the second construction project; and based on determining that the second risk score for the second data object exceeds the threshold risk score, automatically disable a client station associated with the construction service provider from performing a given function via the computing platform.

9. The non-transitory computer-readable medium of claim 8, wherein at least one of the one or more other data objects is related to the second construction project.

10. The non-transitory computer-readable medium of claim 8, wherein the first data object comprises a notice of intent to lien, wherein the construction service provider is a recipient of the notice of intent to lien, and wherein the program instructions that, when executed by the at least one processor, cause the computing platform to automatically disable the client station associated with the construction service provider from performing a given function via the computing platform comprise program instructions that, when executed by the at least one processor, cause the computing platform to:

automatically disable the client station from submitting bids for one or more new construction projects.

11. The non-transitory computer-readable medium of claim 8, wherein the one or more machine-learning models comprise a second one or more machine-learning models, and wherein the program instructions that, when executed by the at least one processor, cause the computing platform to add the received one or more data objects to the construction knowledge graph as respective nodes that are connected to one or more other respective nodes that represent the one or more other data objects comprise program instructions that, when executed by the at least one processor, cause the computing platform to:

determine, via a first one or more machine-learning models, a respective physical location within the first construction project to which each of the received one or more data objects is related;

associate the received one or more data objects with the respective physical locations; and based on the respective physical locations, determine respective relationships for establishing respective edges between the received one or more data objects and the one or more other data objects.

12. The non-transitory computer-readable medium of claim 8, further comprising program instructions that when executed by the at least one processor, cause the computing platform to:

determine, via the one or more machine-learning models, respective second risk scores for at least some other data objects based at least in part on (i) the first risk score for the first data object, (ii) respective degree of separation between the first node in the construction knowledge graph representing the first data object and respective other nodes in the construction knowledge graph representing the at least some other data objects within the construction knowledge graph, and (iii) one or both of a type of the first data object or respective type of respective ones of the at least some other data objects.

13. The non-transitory computer-readable medium of claim 8, wherein the number of edges between the first node and the second node includes:

at least a first edge between the first node and a third node, and at least a second edge between either (i) the second node and the third node or (ii) the second node and another different node.

14. The non-transitory computer-readable medium of claim 8, wherein:

the first data object is added to the construction knowledge graph after the second data object; and the first risk score determined for the first data object causes the second risk score determined for the second data object to exceed the threshold risk score.

15. A method carried out by a computing platform, the method comprising:

receiving one or more data objects related to a first construction project;

adding the received one or more data objects to a construction knowledge graph as respective nodes that are connected, via respective edges, to one or more other respective nodes that represent one or more other data objects, wherein the construction knowledge graph includes at least one path along two or more edges and at least one node between a given pair of nodes that respectively represent different construction projects;

determining, via one or more machine-learning models trained using historic construction project data, a first risk score for a first data object of the received one or more data objects;

determining, via the one or more machine-learning models, a second risk score for a second data object that (i) corresponds to a construction service provider and (ii) is related to a second construction project different from the first construction project, wherein the second risk score is based at least in part on (i) the first risk score for the first data object and (ii) a degree of separation between a first node in the construction knowledge graph representing the first data object and a second node in the construction knowledge graph representing the second data object, wherein the degree of separation is based on a number of edges between the first node and the second node in the construction knowledge graph;

determining that the second risk score for the second data object exceeds a threshold risk score associated with the second construction project; and based on determining that the second risk score for the second data object exceeds the threshold risk score, automatically disabling a client station associated with the construction service provider from performing a given function via the computing platform.

16. The method of claim 15, wherein the one or more machine-learning models comprise a second one or more machine-learning models, and wherein causing the computing platform to add the received one or more data objects to the construction knowledge graph as respective nodes that are connected to one or more other respective nodes that represent the one or more other data objects comprises:

determining, via a first one or more machine-learning models, a respective physical location within the first construction project to which each of the received one or more data objects is related;

associating the received one or more data objects with the respective physical locations; and based on the respective physical locations, determining respective relationships for establishing respective edges between the received one or more data objects and the one or more other data objects.

17. The method of claim 15, wherein the first data object comprises a notice of intent to lien, wherein the construction service provider is a recipient of the notice of intent to lien, and wherein automatically disabling the client station associated with the construction service provider from performing a given function via the computing platform comprises:

automatically disabling the client station from submitting bids for one or more new construction projects.

18. The method of claim 15, further comprising:

determining, via the one or more machine-learning models, respective second risk scores for at least some other data objects based at least in part on (i) the first risk score for the first data object, (ii) respective degree of separation between the first node in the construction knowledge graph representing the first data object and respective other nodes in the construction knowledge graph representing the at least some other data objects within the construction knowledge graph, and (iii) one or both of a type of the first data object or respective type of respective ones of the at least some other data objects.

19. The method of claim 15, wherein the number of edges between the first node and the second node includes:

at least a first edge between the first node and a third node, and at least a second edge between either (i) the second node and the third node or (ii) the second node and another different node.

20. The method of claim 15, wherein:

the first data object is added to the construction knowledge graph after the second data object; and the first risk score determined for the first data object causes the second risk score determined for the second data object to exceed the threshold risk score.

* * * * *